United States Patent [19]

Leung

[11] Patent Number: 5,629,249
[45] Date of Patent: May 13, 1997

[54] SILICON CARBOXIDE FIBERS FROM GEL SPINNING CYCLOSILOXANE POLYMER PRECURSORS

[75] Inventor: Roger Y. Leung, Schaumburg, Ill.

[73] Assignee: AlliedSignal Inc., Morris Township, N.J.

[21] Appl. No.: 185,620

[22] Filed: Apr. 25, 1988

[51] Int. Cl.$^6$ ................................ C04B 35/52
[52] U.S. Cl. ................ 501/87; 501/88; 501/91; 501/92; 501/95
[58] Field of Search .............. 8/115.51; 65/2, 65/436, 440, 17.2, 376, 17.1; 501/35, 87, 88, 91, 92, 95; 156/89; 428/698, 446

[56] References Cited

U.S. PATENT DOCUMENTS

| | | | |
|---|---|---|---|
| 4,100,233 | 7/1978 | Yajima et al. | 423/345 |
| 4,283,376 | 8/1981 | Yajima et al. | 423/345 |
| 4,981,820 | 1/1991 | Renlund et al. | 501/39 |
| 5,180,694 | 1/1993 | Renlund et al. | 501/12 |
| 5,225,283 | 7/1993 | Leung | 428/408 |
| 5,242,866 | 9/1993 | Leung et al. | 502/12 |

FOREIGN PATENT DOCUMENTS

| | | |
|---|---|---|
| 4016569A1 | 1/1969 | Germany . |
| 4033493A1 | 3/1993 | Germany . |
| 1359576 | 2/1972 | United Kingdom . |

*Primary Examiner*—Charles T. Jordan
*Assistant Examiner*—Anthony Chi
*Attorney, Agent, or Firm*—Kyle K. Kappes; Roger Criss; Harold Wells

[57] ABSTRACT

This invention relates to a black glass fiber which is resistant to oxidation at a temperature of about 1350° C. and has the empirical formula $SiC_xO_y$ where x ranges from about 0.5 to about 2.0 and y ranges from about 0.5 to about 2.0. This invention also relates to a process for preparing a black glass fiber comprising reacting a silicon hydride group with a silicon olefinic group in the presence of a hydrosilylation catalyst to give a cyclosiloxane polymer. The polymer is then spun into fiber, hardened and then pyrolyzed to give a black glass fiber.

16 Claims, No Drawings

SILICON CARBOXIDE FIBERS FROM GEL SPINNING CYCLOSILOXANE POLYMER PRECURSORS

BACKGROUND OF THE INVENTION

Silicon carbide and silicon carboxide fibers have many applications as high temperature structural materials. One method of preparing such fibers is that disclosed by Yajima et al. in U.S. Pat. No. 4,283,376. The method disclosed in the '376 patent produces a polycarbosilane which contains some siloxane bonds by adding a polyborosiloxane to a polysilane as shown below.

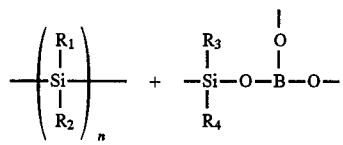

It is stated by the patentee that this reaction gives a polycarbosilane containing the following structural units:

and

where $R_1$, $R_2$, $R_3$ and $R_4$ each represent methyl, phenyl or hydrogen. Only a small number of the B structural units are present in the polycarbosilane. This polycarbosilane can be spun into a fiber and fired at 800° to 1800° C. in vacuum or an inert atmosphere to give a silicon carbide fiber.

Another method for producing silicon carbide fibers is disclosed in U.S. Pat. No. 4,100,233. This involves preparing an organosilicon high molecular weight compound with silicon and carbon as the main skeleton components. This compound is produced by the polycondensation of compounds which contain: 1) only Si-C bonds; 2) Si-H and Si-C bonds, 3) Si-Halogen bonds, 4) Si-N bonds, etc. Once the high molecular weight organosilicon compound is formed it is melted, spun into a fiber and heated to give a silicon carbide fiber.

Further, Great Britain Patent No. 1,359,576 discloses a method of forming a silicone fiber which involves the hydrolysis of organoalkoxy-silanes, followed by mixing the hydrolyzed silane with polyethylene oxide, spinning this mixture and then heating above 600° C. This produces a quartz fiber ($SiO_2$) which contains carbon.

Finally, chemical vapor deposition (CVD) using a gaseous mixture of hydrogen, argon and chlorosilanes can be used to prepare silicon carbide fibers. Usually monofilament carbon fibers are used as the core fiber. The vapors are fed into a reactor at about 1300° C. and the carbon fiber placed therein, resulting in the deposition of SiC onto the core fiber. This method is very expensive.

The instant invention differs significantly from the prior art described above and also offers some advantages. First, the instant invention relates to a continuous silicon carboxide fiber (hereinafter referred to as a black glass fiber) versus silicon carbide or quartz fibers of the prior art. The black glass fibers of the present invention are resistant to oxidation at temperatures as high as 1350° C. This has previously not been observed of a fiber containing a substantial amount of carbon.

The instant invention also provides a method of forming the black glass fiber. This method involves first preparing a cyclosiloxane polymer in solution, then spinning a fiber and finally pyrolyzing the fiber in a non-oxidizing atmosphere to give a black glass fiber. Specifically, the cyclosiloxane polymer is prepared by reacting a silicon hydride group (Si-H) with a silicon olefinic group, e.g. Si—CH=$CH_2$, in the presence of a catalyst to form an ethylene linkage as shown below:

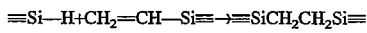

This reaction is known as hydrosilylation and the catalyst employed is known as a hydrosilylation catalyst.

The hydrosilylation reaction differs from the reactions of the prior art which are used to prepare a polymer in, the following ways. The '376 patent involves reacting a polysilane with a polyborosilane to give a polycarbosilane and an alkyl boron or boron hydride as a side product. In contrast to this reaction, the hydrosilylation reaction of the instant invention does not involve any boron in the reaction and no side product, i.e., boron hydride, is produced. The hydrosilylation reaction is an addition reaction, i.e. adding hydrogen to a double bond.

The reaction described in the '233 patent is also different from the hydrosilylation reaction. The '233 patent describes a polycondensation reaction which involves producing radicals of the monomer which radicals then combine (via new Si-C bonds) into an organosilicon polymer with the elimination of a gas such as methane, hydrogen, etc. Again the hydrosilylation reaction does not form any byproduct gas and no new Si-C bonds are formed.

Finally, comparing the instant reaction with that of the '576 patent, it is noted that the '576 patent involves a hydrolysis reaction. There is no water present in the hydrosilylation reaction end thus, these two reactions are completely different.

Once the polymer is formed, it can be formed into a fiber by spinning the polymer. This fiber is now hardened by passing it through a hot zone and then pyrolyzed under a non-oxidizing atmosphere to give a black glass fiber having the formula $SiC_xO_y$ where x ranges from about 0.5 to about 2.0 and y ranges from about 0.5 to about 2.0. Thus, the instant invention provides a black glass fiber and a method of producing a black glass fiber in which the amount of carbon and oxygen in the fiber can be readily controlled.

SUMMARY OF THE INVENTION

This invention relates to a black glass fiber and to a method for preparing a black glass fiber. Thus, one embodiment is a continuous black glass fiber which is resistant to oxidation at a temperature of about 1350° C., is substantially amorphous and has the empirical formula $SiC_xO_y$ where x ranges from about 0.5 to about 2.0 and y ranges from about 0.5 to about 2.0.

Another embodiment of this invention is a process for preparing a black glass fiber comprising:

a) forming a soluble cycle,siloxane polymer by reacting in solution and in the presence of a catalytically effective amount of a hydrosilylation catalyst a silicon hydride group with a silicon olefinic group wherein 1) said silicon hydride and silicon olefinic group are present in the same cyclosiloxane monomer having the formula

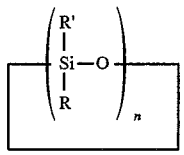

where n is an integer from 3 to about 20, R is hydrogen, and R' is an alkene having from 2 to about 20 carbon atoms and an olefinic carbon bonded directly to silicon, or 2) said silicon hydride and silicon olefinic groups are present on two or more different cyclosiloxane monomers, at least one monomer having a silicon-hydride group and having said formula in which n is an integer from 3 to about 20, R is hydrogen and R' is an alkyl group having from 1 to about 20 carbon atoms and at least one monomer having a silicon olefinic group and having said formula in which R is an alkene having from 2 to about 20 carbon atoms and which has an olefinic carbon directly bonded to silicon and R' is an alkyl group having from 1 to about 20 carbon atoms;

b) forming a spinning solution from the solution containing a soluble cyclosiloxane polymer;

c) spinning the spinning solution to give a polymeric cyclosiloxane fiber;

d) heating the polymeric cyclosiloxane fiber at a temperature of about 50°–200° C. and for a time sufficient to form a hardened polymeric cyclosiloxane fiber; and e) heating the hardened polymeric cyclosiloxane fiber at a temperature of about 700° C. to about 1400° C. in a non-oxidizing atmosphere for a time sufficient to pyrolyze the polymeric fiber into a black glass fiber.

Other objects and embodiments will be found in the following further detailed description of the present invention.

DETAILED DESCRIPTION OF THE INVENTION

As hereinbefore stated, this invention relates to a black glass fiber and to a method of preparing black glass fibers. For the purposes of this specification and the appended claims, the following definition of terms will apply:

1) silicon olefinic group means that a carbon with a double bond in an alkene group is bonded directly to a silicon atom;

2) polymerizing means to make a polymer in a flowable state from the cyclosiloxane monomers;

3) a hardened fiber is a fiber which has structural rigidity and cannot be easily deformed.

Thus, one embodiment of this invention is a method of preparing a black glass fiber. The first step in this process involves preparing a soluble cyclosiloxane polymer. This soluble cyclosiloxane polymer is formed by reacting a silicon olefinic group with a silicon-hydride group in the presence of a hydrosilylation catalyst. The silicon-hydride and silicon olefinic groups can be present in the same cyclosiloxane monomer with the formula

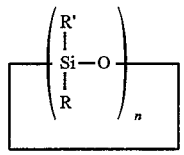

where n is an integer from 3 to about 20, R is hydrogen, and R' is an alkene having from 2 to about 20 carbon atoms and an olefinic carbon bonded directly to silicon. Alternatively, the silicon-hydride and silicon olefinic groups can be present on two or more different cyclosiloxane monomers at least one monomer having said formula in which n is an integer from 3 to about 20, R is hydrogen and R' is an alkyl group having from 1 to about 20 carbon atoms and at least one monomer having said formula in which R is an alkene having from 2 to about 20 carbon atoms which has an olefinic carbon directly bonded to silicon and R' is an alkyl group having from 1 to about 20 carbon atoms.

Illustrative of the cyclosiloxanes which may be used in this invention are:
1,3,5,7-tetramethyltetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylcyclotetrasiloxane,
1,3,5-trimethyltrivinylcyclotrisiloxane,
1,3,5-trivinyltrihydrocyclotrisiloxane,
1,3,5-trimethyltrihydrocyclotrisiloxane,
1,3,5,7,9-pentavinylpentahydrocyclopentasiloxane,
1,3,5,7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcycloheasiloxane,
1,3,5,7,9,11-hexamethylhexahydrocyclohexasiloxane,
1,3,5,7,9,11,13,15,17,19-decavinyldecahydrocyclodecasiloxane,
1,3,5,7,9,11,13,15,17,19,21,23,25,27,29-pentadecavinylpentadecahydrocyclopentadecasiloxane,
1,3,5,7-tetrapropenyltetrahydrocyclotetrasiloxane,
1,3,5,7-tetrapentenyltetrapentylcyclotetrasiloxane and
1,3,5,7,9-pentadecenylpentapropylcyclopentasiloxane.

The polymerization reaction is carried out in the presence of a hydrosilylation catalyst. The hydrosilylation catalyst can be chosen from catalysts that are well known in the art. Usually, the hydrosilylation catalyst is a metal compound where the metal is selected from the group consisting of platinum, iron, nickel, rhodium, cobalt and manganese. Illustrative of these compounds are nickel carbonyl, iron carbonyl, cobalt carbonyl, manganese carbonyl, chloroplatinic acid, platinum divinyltetramethyldisiloxane, platinum carbonyl dichloride, rhodium trichloride, and tris (triphenylphosphine) platinum. The metals themselves, platinum, rhodium, nickel, iron, cobalt and manganese, are also good hydrosilylation catalysts. Of these catalysts, the ones containing platinum are preferred. The catalyst may be added either as a heterogeneous or homogeneous phase, although not with equivalent results. It is preferred to use a homogeneous phase catalyst. The concentration of the catalyst may vary considerably, but for economic reasons and convenience, it is desirable that the catalyst be present in an amount ranging from about 1 ppm to about 200 ppm as the metal in the monomeric solution.

It is also necessary that the polymerization reaction be carried out in solution. The reason for carrying out the reaction in solution is to control the extent of polymerization and to control the viscosity of the resultant polymeric solution. The criteria to be used in selecting a solvent for preparing the solution containing the cyclosiloxane monomers and hydrosilylation catalyst are that the cyclosiloxane monomer be soluble in the solvent and that the solvent not react with the cyclosiloxane monomer. It is preferable, though not necessary, that the hydrosilylation catalyst also be soluble; in the organic solvent. Certain organic solvents are the types of solvents which fit these criteria. Specifically, aliphatic hydrocarbons, aromatic hydrocarbons and ethers may be used. Illustrative of these solvents are toluene, benzene, xylene, hexane, pentane, cyclohexane, heptane, pentene, hexene, tetrahydrofuran, benzyl ethyl ether, etc.

The actual polymerization reaction is carried out by combining a solution containing a hydrosilylation catalyst, preferably the catalyst is dissolved in the solvent, with a solution of the desired cyclosiloxane monomers. It is preferable, though not necessary, that the solvents used to prepare the two solutions be the same. Upon combining the two solutions, the polymerization reaction begins to take place. The polymerization reaction can be carried out at temperatures as low as 10° C. or at elevated temperatures, with the reaction proceeding at a faster rate at elevated temperatures. In order to control the polymerization reaction, the maximum temperature for carrying out the polymerization reaction is about 250° C. It is convenient to carry out the polymerization reaction by heating the solvent containing the cyclosiloxane monomers and catalyst to the refluxing temperature of the solvent. For example, if toluene is the desired solvents, then the mixture is heated to a temperature of about 105° C. Thus a convenient temperature range for carrying out the reaction is about 10° C. to about the refluxing temperature of the organic solvent.

It is important that the polymerization reaction be carried out for a length of time sufficient to obtain a soluble cyclosiloxane polymer. The soluble cyclosiloxane polymer should have a molecular weight of at least 500. However, the reaction should be stopped before the polymer becomes a gel or before occurrence of the gel point. For the purposes of this application, a gel is defined as a cross-linked polymer network swollen in a liquid medium. If the polymer is allowed to crosslink, the polymer becomes insoluble and cannot be spun into a fiber. Although the amount of time required to reach the gel point will depend on the reaction temperature and the concentration of the catalyst, generally about 30 to about 400 minutes is sufficient to ensure polymerization and give a solution containing a soluble cyclosiloxane polymer.

The polymer solution obtained from the above reaction may or may not have the proper properties for forming polymeric cyclosiloxane fibers by the well known spinning technique. Therefore, the solution described above must be formed into a spinning solution. A spinning solution is a solution which has the proper viscosity such that a fiber may be drawn or spun from said solution. One way to form a spinning solution is to distill a portion of the solvent under vacuum until the spinning solution has the proper viscosity for spinning. This viscosity can vary widely, but generally it is desirable to have a spinning solution with a viscosity of about 300 to about 3,000 poise when measured at a shear rate of about 20–500 sec$^{-1}$.

Another method of obtaining a spinning solution is to first precipitate the cyclosiloxane polymer by adding a precipitating agent to the solution, thereby precipitating the cyclosiloxane polymer. The precipitating agent is any liquid in which the cyclosiloxane polymer is insoluble. Illustrative of these precipitating agents are methanol, ethanol, propanol, and mixtures thereof. The precipitated polymer is now isolated and redissolved in an organic solvent so that the viscosity of the resulting solution is about 300 to about 3,000 poise when measured at a shear rate of about 20 to about 500 sec$^{-1}$. The organic solvent in which the cyclosiloxane polymer is redissolved may be the same or a different solvent from the organic solvent in which the cyclosiloxane polymer was originally formed. Toluene is the preferred solvent.

Yet another method of forming a spinning solution is to add a soluble high molecular weight polymer to the solution in order to increase the viscosity of the solution and form a spinning solution. This soluble high molecular weight polymer may be selected from the group consisting of polymethylhydrosiloxane, vinylmethylsiloxane polymer, polydimethylsiloxane, and polysilsequioxane. For example, polymethylhydrosiloxane of molecular weight of about 5,000 may be added to the solution to give a spinning solution. The amount of high molecular weight polymer which may be added to the solution depends on the viscosity of the solution, but generally from about 1 to about 10 weight percent of the solution should be added. This additional polymer may be added to the solution either before or after the formation of the cyclosiloxane polymer. Finally, the viscosity of the spinning solution may be controlled by both adding a high molecular weight polymer and by vacuum distilling some of the organic solvent.

Regardless of how the spinning solution is formed, the fibers are formed from the spinning solution by spinning techniques well known in the art. One such method is to spin the solution through a nozzle and then heat the formed fiber in flowing air at a temperature of about 50°–200° C. Heating the fiber hardens the fiber. The amount of time needed to harden the fiber is usually very small, on the order of about 0.1 to about 5 seconds. The usual process is to continuously pull the fiber through a heating zone at a rate such that the residence time in the heating zone is about 0.1 to about 5 seconds. Hardening of the fiber takes place by the process of either removing all the solvent from the fiber, or cross-linking the cyclosiloxane polymer or both. Both processes occur at the higher temperatures. The reason for desiring a hardened fiber is so that the shape of the fiber does not change upon pyrolysis.

Another spinning procedure involves extruding the spinning solution through an aperture into a coagulation bath, thereby hardening the fiber. The coagulation bath is composed of a liquid medium in which the cyclosiloxane polymer is insoluble, for example a 1:1 methanol/ethanol mixture. However, it is preferred to use a high boiling medium so that cross-linking can also take place. For example, the coagulation bath may consist of glycerin which is heated above 100° C. The resultant fiber may be extracted using a volatile solvent and dried.

Regardless of how the polymer fiber is formed, the polymer fiber is next converted into a ceramic black glass fiber by pyrolyzing the polymer fiber in a non-oxidizing atmosphere at a temperature of about 700° to about 1400° C. The non-oxidizing atmosphere may be nitrogen, argon, or a vacuum. The amount of time required to form the black glass fiber can vary depending on the pyrolysis temperature but generally a time of about 2 minutes to about 30 hours is sufficient to completely form the black glass fiber.

The black glass fiber may be represented by the formula $SiC_xO_y$, where x ranges from about 0.5 to about 2.0, and y ranges from about 0.5 to about 2.0. This fiber is another embodiment of this invention. The black glass fiber of this invention is characterized in that it is highly resistant to oxidation. Samples of this black glass were heated in air to about 1350° C. and showed only about a 1% weight loss.

X-ray analysis of these fibers also shows that the fibers are substantially amorphous with only about 1% of an unidentified crystalline phase present. The fibers of this invention as produced in the laboratory had an average diameter of about 120 microns and a tensile strength of about 250–400 MPa. However, using commercial spinning apparatus one can obtain fibers with a diameter of about 15 to about 25 microns and a tensile strength of several times greater than observed from the fibers produced on a laboratory scale. Finally, the black glass fibers of this invention retain at least 70% of their initial strength after heating in air at 1,000° C. for one hour.

As stated herein, these fibers have applications as high temperature structural materials. Other uses for these fibers are fiber reinforced metals, fire-retardant cloths, airplane structural materials, etc.

The following examples are given for illustrative purposes only. It is to be understood that these examples are not intended as an undue limitation on the broad scope of the invention as set forth in the appended claims.

EXAMPLE I 3.45 ml of tetravinyltetramethylcyclotetrasiloxane and 2.40 ml of tetramethylcylcotetrasiloxane were dissolved in 62.5 ml of toluene. To this solution there were added 0.02 ml of a catalyst solution containing 1% platinum divinyltetramethyldisiloxane in toluene. The solution was poured into a three-neck flask and refluxed for 3 hours. After the solution was cooled to room temperature, the polymer product was precipitated by adding a 1:1 mixture of $CH_3OH/C_2H_5OH$ to the toluene solution. A white powder was obtained. A spinning solution containing 85 weight percent of the cyclosiloxane polymer and 15 weight percent toluene was prepared. The viscosity of the spinning solution was about 800 poise at a shear rate of 384 sec$^{-1}$ at 22° C. The viscosity was measured using a Haake viscometer with a "Cone and Plate" sensor system. Cyclosiloxane polymer fibers of 2–3 feet long were hand-drawn by using simple pulling techniques. The drawn fibers were dried and further hardened by intense infrared radiation.

The cyclosiloxane polymer fibers were placed in a furnace and heat-treated in flowing nitrogen to 1200° C. at a heating rate of 200° C. per hour. A black glass fiber was obtained. The char yield of the pyrolysis step is 84%. Elemental analysis showed that the black glass contained 26.1% carbon by weight. This carbonaceous black glass had the empirical formula of $SiC_{1.37}O_{1.03}$ as determined by elemental analysis.

The black glass fibers were ground into powders and tested for their thermal stability by thermogravimetric analysis (TGA). It was found that the carbonaceous black glass lost less than 0.6% by weight when heated in flowing air to 1150° C. at a heating rate of 10° C. per minute. Ini another TGA experiment, the black glass powders were heated in flowing air to 1450° C. at a heating rate of 10° C. per minute. The weight of the sample remained constant within 1.5 weight percent up to 1350° C. However, the sample gained 3.5% by weight when heated from 1350° C. to 1450° C.

X-ray diffraction of the black glass indicated a predominantly amorphous or microcrystalline structure. Several unidentified crystalline lines were observed. The percentage of crystalline phase was estimated to be less than 1%.

EXAMPLE II 12.4 ml of vinylmethylcyclosiloxane containing mixtures of cyclotetramer to cyclohexamer, 7.00 ml of methylhydrocyclosiloxane containing mixtures of cyclotetramer to cyclohexamer and 1.60 ml polymethylhydrosiloxane of molecular weight about 5,000 were mixed and dissolved in 190 ml toluene. To this solution there were added 0.03 ml of a solution containing 3% platinum divinyltetramethyldisiloxane in toluene. The solution was refluxed for 4 hours. Toluene was removed from the reflux solution at ambient temperature by distillation under reduced pressure until the remaining solution had a viscosity of 500 poises at a shear rate of 384 sec$^{-1}$. Cyclosiloxane polymer fibers were drawn from the concentrated polymer solution.

The cyclosiloxane polymer fibers were pyrolyzed in flowing nitrogen to 1,000° C. The heating cycle included heating to 500° C. at 200° C./hour, held at 500° C. for 1 hour, heating to 1,000° C. at 200° C./hour and cooling to room temperature at 200° C./hour. Carbon containing black glass fibers were produced. Scanning Electron Microscope (SEM) pictures of the black glass fibers showed that the fiber had a smooth surface with a small number of pinholes and cracks. The cross-section of the fiber was slightly oblong and its diameter was about 125 microns. The tensile strength of the fibers at room temperature was between 250–400 MPa for these large diameter fibers and the Young's modulus was in the range of 45–60 GPa. The tensile strength of the fibers after heat-treating in air for one hour (with a heating and cooling rate of 250° C./hour) was in the range of 150–300 MPa. In general, the fiber retained about 70% of its initial strength after 1 hour at 1,000° C.

Thus, having described the invention in detail, it will be understood by those skilled in the art that certain variations and modifications may be made without departing from the spirit and scope of the invention as defined herein and in the appended claims.

I claim as my invention:

1. A process for preparing a black glass fiber comprising:
   a) forming a soluble cyclosiloxane polymer by reacting in solution and in the presence of a catalytically effective amount of a hydrosilylation catalyst a silicon hydride group with a silicon olefinic group wherein 1) said silicon hydride and silicon olefinic group are present in the same cyclosiloxane monomer having the formula

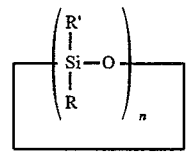

where n is an integer from 3 to about 20, R is hydrogen, and R' is an alkene having from 2 to about 20 carbon atoms and an olefinic carbon bonded directly to silicon, or 2) said silicon hydride and silicon olefinic groups are present on two or more, different cyclosiloxane monomers, at least one monomer having a silicon-hydride group and having said formula in which n is an integer from 3 to about 20, R is hydrogen and R' is an alkyl group having from 1 to about 20 carbon atoms and at least one monomer having a silicon olefinic group and having said formula in which R is an alkene having from 2 to about 20 carbon atoms and which has an olefinic carbon directly bonded to silicon and R' is an alkyl group having from 1 to about 20 carbon atoms;

b) forming a spinning solution from the solution containing a soluble cyclosiloxane polymer;

c) spinning the spinning solution to give a polymeric cyclosiloxane fiber;

d) heating the polymeric cyclosiloxane fiber at a temperature of about 50°–200° C. and for a time sufficient to form a hardened polymeric cyclosiloxane fiber; and e) heating the hardened polymeric cyclosiloxane fiber at a temperature of about 700° C. to about 1400° C. in a non-oxidizing atmosphere for a time sufficient to pyrolyze the polymeric fiber into a black glass fiber.

2. The process of claim 1 where the soluble cyclosiloxane polymer is formed at a temperature of about 10° C. to about 250° C., and a time sufficient to form the soluble cyclosiloxane polymer but less than a time sufficient to reac the gel point.

3. The process of claim 1 where the hydrosilylation catalyst is a metal or a metal compound wherein the metal is selected from the group consisting of platinum, iron, nickel, rhodium, cobalt and manganese, and is present in an amount ranging from about 1 ppm to about 200 ppm as the metal.

4. The process of claim 3 where the metal compound is platinum divinyltetramethyldisiloxane.

5. The process of claim 1 further characterized in that an organic solvent is used to prepare the solution containing the cyclosiloxane monomer and hydrosilylation catalyst.

6. The process of claim 5 where the organic solvent is selected from the group consisting of xylene, toluene, benzene and tetrahydrofuran.

7. The process of claim 1 further characterized in that the spinning solution has a viscosity of about 300 to about 3,000 poise when measured at a shear rate of about 20 to about 500 $sec^{-1}$.

8. The process of claim 1 where the step of forming a spinning solution is further characterized by distilling under vacuum a portion of the organic solvent until the viscosity of the resultant spinning solution is about 300 to about 3,000 poise when measured at a shear rate of about 20 to about 500 $sec^{-1}$.

9. The process of claim 1 where the step of forming a spinning solution is further characterized by adding a precipitating agent to the solution containing a soluble cyclosiloxane monomer, thereby precipitating a cyclosiloxane polymer, isolating the polymer and redissolving the cyclosiloxane polymer in an organic solvent, thereby providing a spinning solution with a viscosity of about 300 to about 3,000 poise when measured at a shear rate of about 20 to about 500 $sec^{-1}$.

10. The process of claim 9 where the precipitating agent is selected from the group consisting of methanol, ethanol, propanol, and mixtures thereof.

11. The process of claim 9 where the organic solvent is selected from the group consisting of xylene, toluene, benzene and tetrahydrofuran.

12. The process of claim 1 where the non-oxidizing atmosphere is nitrogen, argon or a vacuum.

13. The process of claim 1 where the solution also contains a high molecular weight polymer, present in an amount from about 1 to about 10 weight percent of the solution.

14. The process of claim 13 where the polymer is selected from the group consisting of polymethylhydrosiloxane, vinylmethylsiloxane polymer, polymethylsiloxane and polysilsequioxane.

15. The product of the process of claim 1.

16. A continuous black glass fiber which is resistant to oxidation at a temperature of about 1350° C., is substantially amorphous, and has the empirical formula $SiC_xO_y$ where x ranges from about 0.5 to about 2.0 and y ranges from about 0.5 to about 2.0.

* * * * *